I. L. GREEN.
VACUUM CLEANER.
APPLICATION FILED JAN. 26, 1909.

941,676.

Patented Nov. 30, 1909.

Witnesses,
Jos. W. Ferguson
Margaret L. Smith.

Inventor,
Ira L. Green;
By A. B. Upham
Attorney.

UNITED STATES PATENT OFFICE.

IRA L. GREEN, OF LUDLOW, VERMONT.

VACUUM-CLEANER.

941,676.   Specification of Letters Patent.   Patented Nov. 30, 1909.

Application filed January 26, 1909. Serial No. 474,320.

*To all whom it may concern:*

Be it known that I, IRA L. GREEN, a citizen of the United States, and a resident of Ludlow, in the county of Windsor and State of Vermont, have invented certain new and useful Improvements in Vacuum-Cleaners, of which the following is a specification.

This invention relates to portable devices for removing dust and dirt from household articles and furnishings, and it consists in the construction of the improvements in dust and dirt separators hereinafter set forth.

Figure 1:
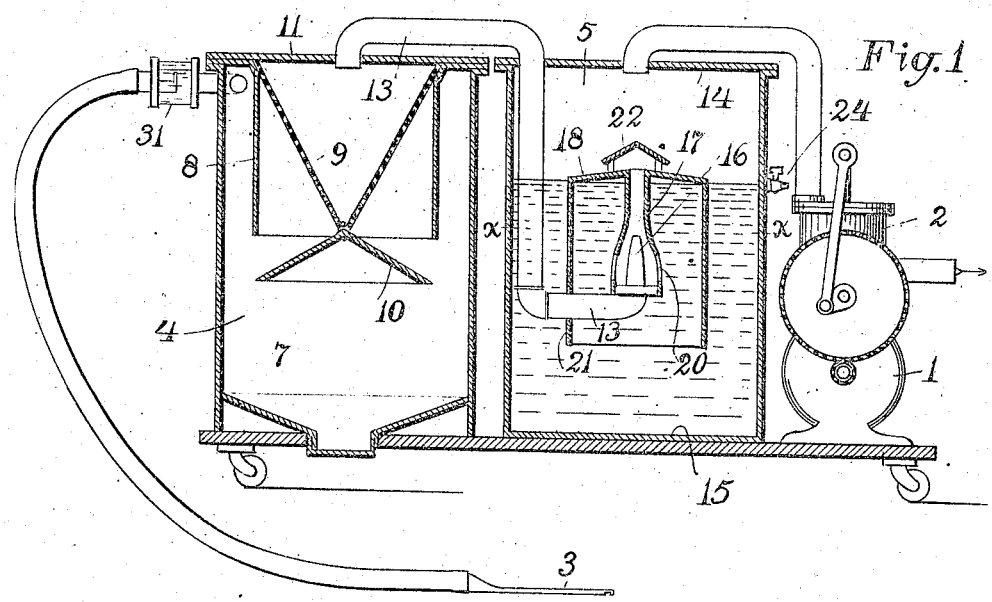
Figure 3:
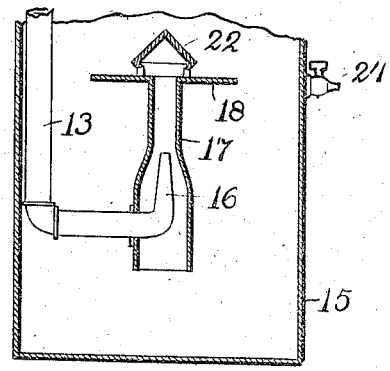
Figure 4:
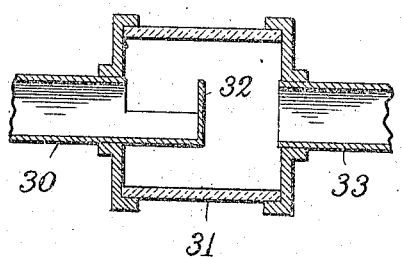
Figure 2:
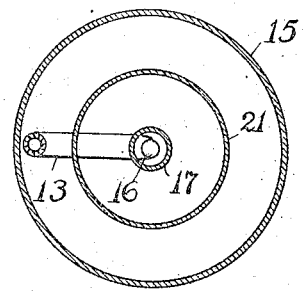

Referring to the drawings forming part of this specification, Figure 1 is a vertical longitudinal section of a vacuum cleaner made in accordance with my invention. Fig. 2 is a horizontal section on the line X—X in Fig. 1 of one of the members of the dust separating means. Fig. 3 is a central vertical section of the same, but slightly modified. Fig. 4 is a central vertical section of the dust-viewing device introduced into the pipe which conducts the dust-laden air from the suction-mouth to the dust-separator.

The vacuum cleaner as a whole comprises a motor, here shown as an electric motor 1 adapted to operate a suction-producing means, as a plunger pump 2; a suction or intake mouth 3, connected with the dust separator; and initial dirt separator 4 for removing from the air current the larger particles of the dirt; and a dust separator 5 for removing from the air current all the dust remaining therein.

The initial dirt separator 4 consists of an air tight tank 7 having an annular partition 8 depending from within its top, a conical screen 9 and a conical deflector 10; the screen having its base secured to the top or cover 11, and its inverted apex supporting the conical deflector. The dust laden air from the mouth 3 enters the annular space between said partition and the interior of the tank, and passes out from the tank through the outlet through the said cover. Said outlet is continued in a pipe 13 over to the dust separator 5, down through its cover 14 it descends nearly to the bottom of the tank 15. From this point, the pipe 13 passes horizontally to substantially the center of the tank, and thence turns vertically upward, terminating in a jet-nozzle 16. About said nozzle is a sleeve 17 whose upper end terminates in a substantially horizontal flange or deflector 18, while the lower part of said sleeve is adapted for receiving an inrush of water from that within the tank. The method of thus receiving such inrush may be either by having the lower end open, as shown in Fig. 3, or by forming openings 20 through it, as in Fig. 1. So, also, the flange or deflector 18 may be provided with a depending annular apron 21, as shown in Fig. 1, or be unprovided therewith, as in Fig. 3; but the former appears to give the most perfect results.

Close above the end of the sleeve 17 is a cap 22 up against which the air and water is forced by the jet issuing from the nozzle 16, and thence thrown down upon the deflector 18, and outward to the surface of the water within the tank. This serves to thoroughly intermix the dust-laden air and the water, and to thereby cause such dust to be entirely removed from the air and taken up by the water. It is best to maintain the surface of the water in this tank just below the level of the outer edge of the deflector 18, for the reason that if the water is much lower some of the dust may have an opportunity to escape from its entangling water; while if the level is too high, the water will interfere with the outrush of spray and moistened dust from the narrow slit between the under edge of the cap or breaker 22.

The purpose of the depending apron 21 is to cause the current of water from the deflector 18 down and back to the nozzle 16, to descend more nearly to the sides of the tank and consequently to insure that whatever dust will settle will be deposited farther from the inrushing water passing to said nozzle.

To insure the proper level of the water in the tank 15, a pet-cock 24 is provided in the side of the tank at such point.

The dust-viewing device, as shown in Fig. 4, comprises a glass cylinder 31 inclosing the pipe section 30, half of whose periphery is cut away within the cylinder, and a deflector-cap 32 fixed at the end of the pipe. By this means, the dust laden air is thrown radially outward toward the glass cylinder before it can escape up through the pipe-section 33, and thereby renders itself quite clearly visible.

What I claim as my invention and for which I desire Letters Patent is as follows, to wit:—

1. The combination with a suction producing means, of a water tank having a vertically discharging nozzle below the surface of the water in said tank, a sleeve loosely surrounding said nozzle and terminating at its upper end just above the surface of such water, and a cap located a short distance above said upper end.

2. The combination with a suction producing means, of a water tank having a nozzle therein receiving the air current, a sleeve concentric with said nozzle communicating with the water within the tank at one end and terminating at its opposite end in a radially extended flange.

3. The combination with a suction producing means, of a water tank having an upwardly opening nozzle receiving the air current, a sleeve surrounding said nozzle and opening at its lower end to the water in the tank, a flange extending outward from the upper end of said sleeve, and a cap located a short distance above the upper end of said sleeve.

4. The combination with a suction producing means, of a water tank having an upwardly opening nozzle receiving the air current, a sleeve surrounding said nozzle and communicating at its lower end with the water in said tank, a flange extending outward from the upper end of said sleeve, a cap fixed above said end, and an annular apron depending from the periphery of said flange.

5. The combination with a suction producing means, of a water tank having an upwardly opening nozzle centrally located within it and receiving the air current, a sleeve surrounding said nozzle and communicating below the nozzle with the water within the tank, a slightly sloping flange extending outward from the upper end of said sleeve, an annular apron depending from the periphery of said flange, a cap fixed a short distance above the upper end of said sleeve, and means for insuring the water level within the tank approximately at the level of the outer edge of said flange.

6. The combination with a suction producing means, of a water tank having an upwardly directed nozzle centrally within it receiving the air current, a sleeve surrounding said nozzle and receiving water at its lower end, an outwardly extended flange at the upper end of said sleeve, and a cap fixed a short distance above the upper end of said sleeve; said cap being conical in form.

In testimony that I claim the foregoing invention, I have hereunto set my hand this 16th day of January, 1909.

IRA L. GREEN.

Witnesses:
F. L. SMITH,
H. E. FULLER.